April 27, 1926.

F. C. STIER

BODY CONSTRUCTION

Filed Jan. 6, 1922

INVENTOR:
Frank C. Stier
BY Edward R. Alexander
ATTORNEY.

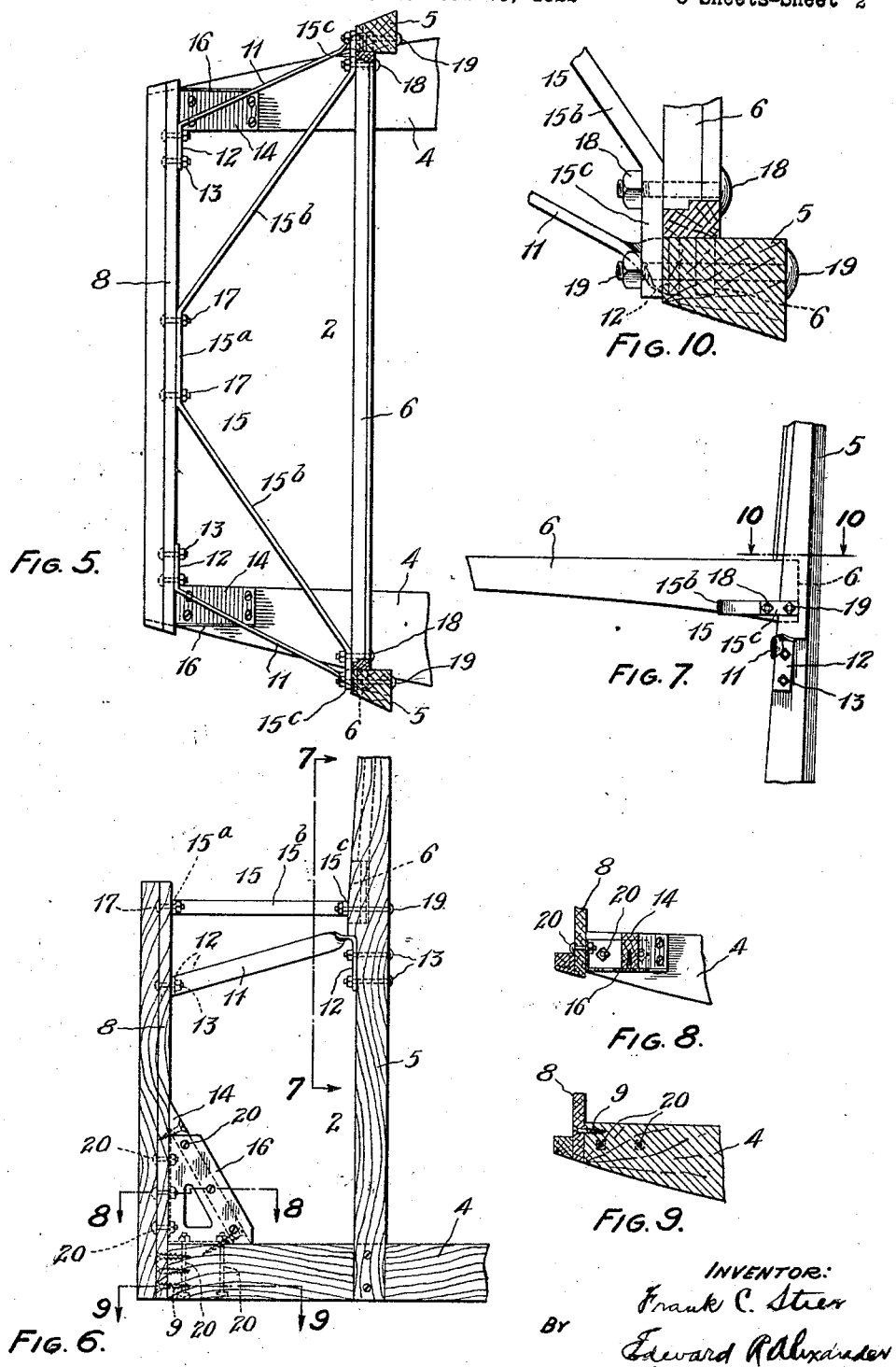

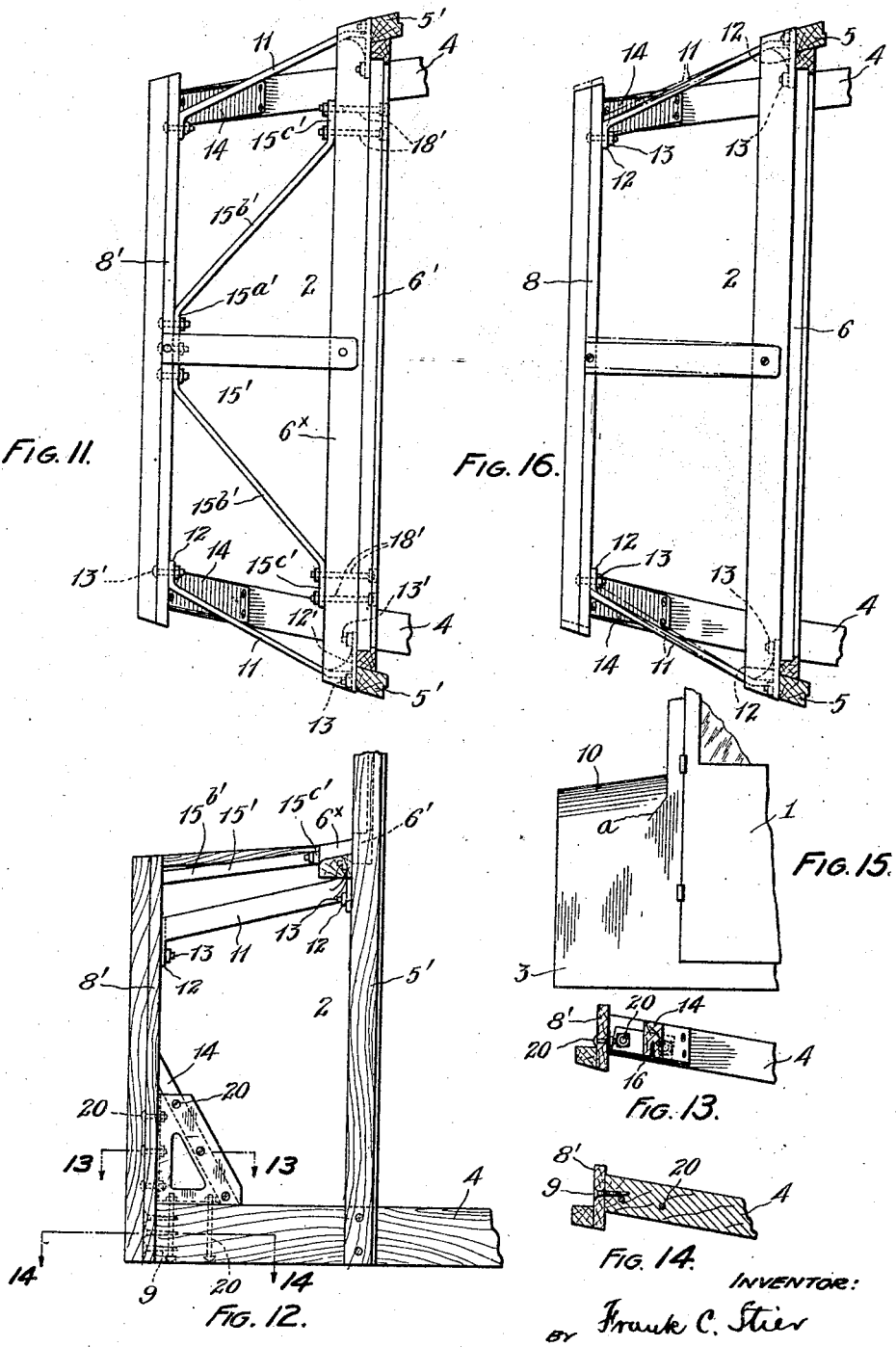

Patented Apr. 27, 1926.

1,582,554

UNITED STATES PATENT OFFICE.

FRANK C. STIER, OF CLEVELAND, OHIO, ASSIGNOR TO THE BAKER R & L COMPANY, OF CLEVELAND, OHIO, A CORPORATION OF OHIO.

BODY CONSTRUCTION.

Application filed January 6, 1922. Serial No. 527,497.

*To all whom it may concern:*

Be it known that I, FRANK C. STIER, a citizen of the United States, residing at Cleveland, in the county of Cuyahoga and State of Ohio, have invented certain new and useful Improvements in and Relating to Body Constructions, of which the following is a specification.

This invention relates to a body for vehicles, particularly vehicles of the motor vehicle type.

One object of the invention is to provide an improved body, whereby it is made more durable and capable of withstanding strains. The invention relates particularly to the construction of the fore-part of the body and has for another object the provision of an improved construction in which relative torque and lateral movements between the main body portion and the cowl are prevented, whereby rigidity and durability are obtained in the forepart of the body frame and strain upon and tearing of the sheathing therefor, are avoided.

Another object of the invention is to provide an improved body construction in which the joined portions of the cowl and lower frame members of the body are rigidly held in place.

Other objects of the invention will be apparent to those skilled in the art to which my invention relates from the following description taken in connection with the accompanying drawings.

In the drawings Fig. 1 is a side elevation of a vehicle body embodying my invention.

Fig. 5 is a section similar to Fig. 4, enlarged.

Fig. 6 is a side view of the parts shown in Fig. 5.

Fig. 7 is a fragmentary front view of the parts shown in Fig. 10.

Fig. 8 is a section on the line 8—8 of Fig. 6.

Fig. 9 is a section on the line 9—9 of Fig. 6.

Fig. 10 is a section on line 10—10 of Fig. 7.

Figs. 11 and 12 are views similar to Figs. 5 and 6, respectively, but showing a modified form of my invention.

Figure 1:
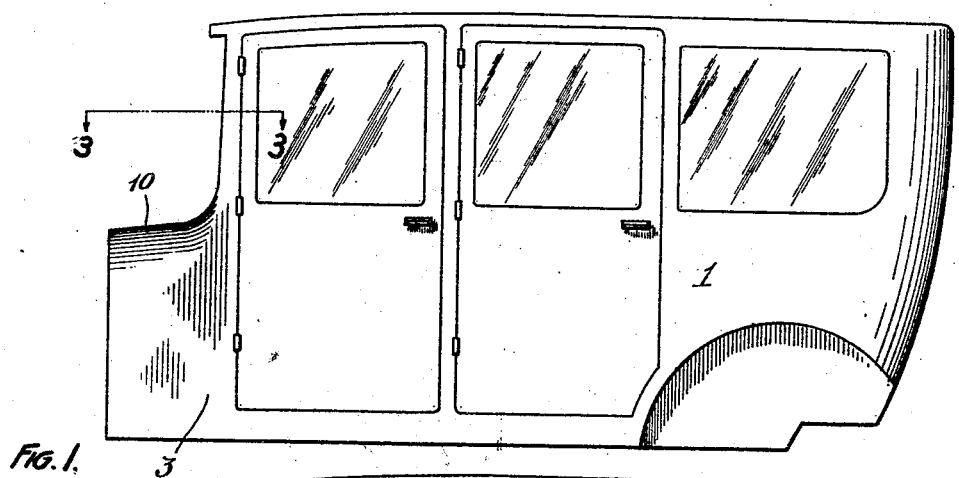

Figs. 13 and 14 are sectional views on the lines 13—13 and 14—14 of Fig. 12, respectively.

Fig. 15 is a fragmentary side elevation of a body showing the tearing of the body sheathing resulting from torque and lateral movements between the cowl and body, incident to the operation of the vehicle.

Fig. 16 is a view similar to Figs. 5 and 11 of a body construction shown in Fig. 15, the dotted lines illustrating the relative movements of the structural elements.

In the drawings, 1 indicates as an entirety a vehicle body. The body shown for illustration purposes is known as a sedan. The invention is applicable to all other types of bodies. The body comprises a frame 2, preferably of skeleton construction, formed in sections which are secured together in any desired manner, and a sheathing 3. The sheathing may be constructed and applied in the manner set forth in the application of Lawrence F. Stier, filed April 26, 1921, Serial No. 464,509.

As my invention relates to the construction of the forepart of the body, I have, for obvious reasons, restricted the detail illustration thereto. 4 indicates the lower longitudinal frame members of the body 1. 5 indicates the upright members, the forward ones only of which are shown. The upright members 5 are secured to the frame members 4 in any desired manner. 6 indicates a transverse bar adapted to support the windshield of the body. The supporting bar 6 is connected at its opposite ends to the upright 5, preferably by tongue and groove joints more particularly shown in Figs. 5 and 10. 8 indicates a front body member disposed vertically and connected to the front ends of the frame members 4 by screws or other devices 9. The body member 8 has a contour corresponding to the front edge of the cowl 10 to support and give shape thereto. 11 indicates a plurality of stabilizing devices disposed between and connected at their opposite ends to the cowl supporting member 8 and the forward uprights 5. Each stabilizing device 11 preferably comprises an iron or steel bar having at its opposite ends feet 12 which are secured, as by bolts 13, to the adjacent frame members. 14 indicates a pair of braces each extending at an angle and connected at its opposite ends to the cowl supporting member 8 and the adjacent lower frame member 4. A vehicle body constructed as above described is shown in Figs. 15 and 16. Such construction has been found to be totally insufficient to meet the strains and stresses incident to operation of the vehicle and particularly to prevent relative movements between (1) the body proper and the cowl supporting member of substantially a torque character and also laterally as indicated by the dotted lines in Fig. 16, and (2) the lower frame members 4 and cowl supporting member 8. By experience I have found that in many body constructions these relative movements were sufficient, due to use of the vehicle body, to break or tear the sheathing along that portion where the cowl merges into the side portion or upper front quarter section of the body, as shown at $a$ in Fig. 15, thus materially affecting the exterior appearance of the vehicle and permitting the elements to get into the interior of the body, and to materially affect the rigidity of the frame at its front portion.

To overcome these objections, I provide a combined connecting and bracing element, indicated as an entirety at 15, between the cowl supporting member 8 and main portion of the body. I also preferably provide a gusset 16 at the joint between each lower frame member 4 and the cowl supporting member 8.

The combined connecting and bracing element 15 preferably comprises a substantially U-shaped member formed of bar iron, the base section $15^a$ of the member being disposed flat against and connected to the central portion of the cowl supporting member 8 near its upper edge by a plurality of bolts 17 or other suitable devices. The legs $15^b$ of the brace member are preferably straight and diverge from the base section $15^a$ toward the opposite sides of the body, their outer or free ends being provided with feet $15^c$ which engage the body, being secured thereto by any suitable means. In the preferred form of construction the feet $15^c$ overlap the joints between the uprights 5 and wind-shield bar 6, each being secured thereto by bolts 18 and 19, the latter bolt operating also to secure the wind-shield bar 6 and upright 5 together. This arrangement not only ties the bar 6 and uprights 5 together, but forms a bridging connection between the cowl support and uprights to prevent relative movements between them and spreading of the latter.

The gussets 16 comprise angle plates secured in a well known manner to the member 8 and adjacent frame member 4 and along its inclined edge to the adjacent brace 14 by suitable screws or bolts 20. This form of construction serves to rigidly secure the supporting member 8 and frame members 4 together whereby they successfully resist the lateral strains resulting from running of the vehicle. The combined connecting and bracing element 15 and gussets 16 are disposed in position so as to resist most effectively the greatest strains between the main body portion, the cowl and cowl support and the frame members, thereby preventing relative movements therebetween and resulting damage to the exterior sheathing.

The construction is particularly advantageous in modern vehicle constructions wherein the body is of skeleton form and fabricated as an entirety from sections and shaped to receive a relatively thin sheet sheathing which in itself is merely intended to serve as a covering to give exterior finish to the body and unadapted to brace or strengthen it in any particular.

Figure 2:
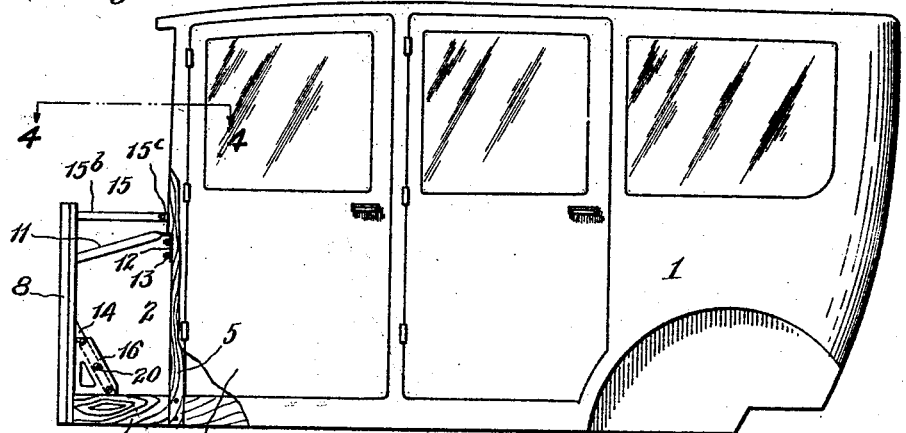
Fig. 2 is a view similar to Fig. 1 with parts broken away.
Figure 3:
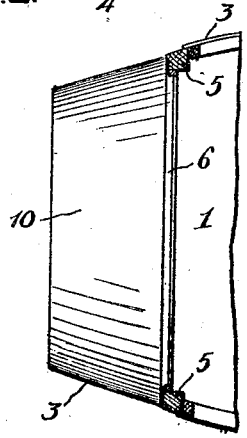
Fig. 3 is a fragmentary section on the line 3—3 of Fig. 1.
Figure 4:
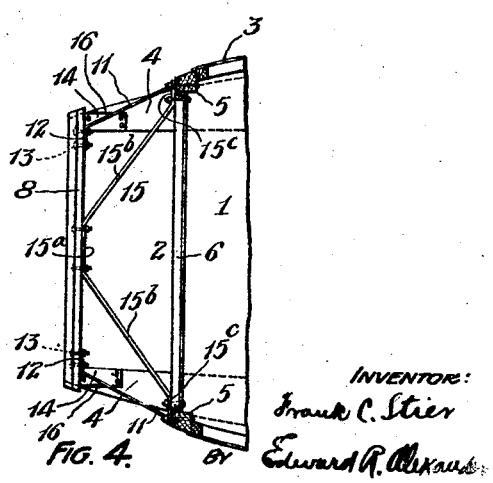
Fig. 4 is a fragmentary section on the line 4—4 of Fig. 2.

In Figs. 11 to 14 inclusive I have shown a slightly modified form of the invention. In these views the body is constructed like that shown in Figs. 1 to 10, inclusive except I provide a supplemental transverse bar $6^x$ and connect it to the transverse bar $6'$, which supports the windshied of the vehicle. $15'$ indicates the brace connected to and bridged between the cowl supporting member $8'$ and bar $6^x$ and windshield supporting bar $6'$. The base section $15^{a'}$ of the brace $15'$ is connected to the central portion of the member $8'$. The legs $15^{b'}$ diverge from the base section towards the opposite ends of the bar $6^x$, but are connected thereto and the bar $6'$ by bolts $18'$ extending through the feet $15^{c'}$ at the outer ends of the legs $15^{b'}$ and bars $6^x$, $6'$. In this form of construction the brace $15'$ is connected directly to the bar $6^x$ and through it to the uprights $5'$.

To those skilled in the art of making articles or apparatus of the class described, many alterations in construction and widely differing embodiments and applications of my invention will suggest themselves, without departing from the spirit and scope thereof. My disclosures and the description herein are purely illustrative and are not intended to be in any sense limiting.

What I claim is:

1. In a body construction for vehicles, the combination of a body having a pair of frame members, uprights connected to said frame members, respectively, a bar disposed above said frame members and connected at its opposite ends to said uprights, a cowl supporting member connected to said frame members in spaced relation to said bar, a combined connecting and bracing element of U-shape arranged in substantially horizontal position, the base portion of said element being connected to the central portion of the said cowl supporting member and its legs diverging therefrom toward the opposite sides of the body and overlapping the joints between said bar and said uprights, and means for connecting each said leg to said bar and the adjacent upright.

2. In a body construction for vehicles, the combination of a pair of frame members, uprights each connected to one of said members, a bar spaced from said frame members and connected at its opposite ends to said uprights, a cowl supporting member supported on said frame members in spaced relation to said uprights and said bar, a pair of bars connected to the central portion of said cowl supporting member near its upper end and diverging therefrom towards the opposite sides of the body, the free end of each said diverging bar overlapping the joint between said first mentioned bar and the adjacent upright, and means for securing the free end of each diverging bar to said first mentioned bar and the adjacent upright.

In testimony whereof I affix my signature.

FRANK C. STIER.